US007590712B2

(12) United States Patent
Chambers, II et al.

(10) Patent No.: US 7,590,712 B2
(45) Date of Patent: Sep. 15, 2009

(54) METHODS AND SYSTEMS FOR MANAGEMENT AND CONTROL OF AN AUTOMATION CONTROL MODULE

(75) Inventors: Robert Baxter Chambers, II, Barboursville, VA (US); David Scott Collier, Charlottesville, VA (US); Ferrell Louis Mercer, Madison, VA (US); Jason Daniel Kadingo, Palmyra, VA (US); Robert Francis Newman, Borboursville, VA (US); David Charles Elliott, Ruckersville, VA (US); David J. Hietanen, Charlottesville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 623 days.

(21) Appl. No.: 10/238,360

(22) Filed: Sep. 10, 2002

(65) Prior Publication Data
US 2004/0049557 A1 Mar. 11, 2004

(51) Int. Cl.
*G06F 15/173* (2006.01)
(52) U.S. Cl. .................. 709/223; 709/224; 709/225
(58) Field of Classification Search .......... 709/212, 709/217, 220, 246, 250, 221, 25, 223–225
See application file for complete search history.

(56) References Cited

U.S. PATENT DOCUMENTS

| | | | | |
|---|---|---|---|---|
| 5,995,744 A * | 11/1999 | Guccione | .................. | 703/23 |
| 6,061,603 A * | 5/2000 | Papadopoulos et al. | ....... | 700/83 |
| 6,144,933 A * | 11/2000 | Guccione | .................. | 703/23 |
| 6,560,639 B1 * | 5/2003 | Dan et al. | .................. | 709/218 |
| 6,578,146 B2 * | 6/2003 | Johnson | .................. | 713/189 |
| 6,584,074 B1 * | 6/2003 | Vasamsetti et al. | .......... | 370/254 |
| 6,668,279 B1 * | 12/2003 | Curtis | .................. | 709/218 |
| 6,693,661 B1 * | 2/2004 | Vanderwilt et al. | ....... | 348/14.01 |
| 6,721,607 B2 * | 4/2004 | Brault | .................. | 700/18 |
| 6,775,559 B1 * | 8/2004 | Weghorst et al. | .......... | 455/558 |
| 6,826,597 B1 * | 11/2004 | Lonnroth et al. | .......... | 709/207 |
| 6,854,120 B1 * | 2/2005 | Lo et al. | .................. | 719/311 |
| 6,941,369 B1 * | 9/2005 | Krack et al. | .................. | 709/225 |
| 2003/0033376 A1 * | 2/2003 | Brownhill et al. | .......... | 709/218 |
| 2003/0041136 A1 * | 2/2003 | Cheline et al. | .......... | 709/223 |
| 2003/0046231 A1 * | 3/2003 | Wu | .................. | 705/43 |
| 2003/0084128 A1 * | 5/2003 | Anderson et al. | .......... | 709/220 |
| 2003/0093468 A1 * | 5/2003 | Gordon et al. | .......... | 709/203 |
| 2003/0140132 A1 * | 7/2003 | Champagne et al. | ....... | 709/223 |
| 2004/0049557 A1 * | 3/2004 | Chambers et al. | .......... | 709/219 |
| 2004/0049674 A1 * | 3/2004 | Collier et al. | .......... | 713/153 |
| 2004/0165544 A1 * | 8/2004 | Cornett et al. | .......... | 370/254 |
| 2004/0177200 A1 * | 9/2004 | Chu | .................. | 710/301 |
| 2005/0144601 A1 * | 6/2005 | Lo | .................. | 717/140 |
| 2005/0210296 A1 * | 9/2005 | Devine et al. | .......... | 713/201 |
| 2005/0216421 A1 * | 9/2005 | Barry et al. | .......... | 705/64 |

\* cited by examiner

*Primary Examiner*—Nathan J Flynn
*Assistant Examiner*—Mohamed Wasel
(74) *Attorney, Agent, or Firm*—Mark A. Conklin, Esq.; Armstrong Teasdale LLP

(57) ABSTRACT

An automation control module (ACM) includes an ACM central processing unit (CPU), a backplane electrically coupled to the ACM CPU, and a web system embedded within the ACM and electrically coupled to the ACM CPU and backplane. The web system includes a secure web server and is configured to process hypertext transfer protocol (HTTP) requests from a network to program and configure the ACM through the network. The HTTP requests are received by the secure web server and transmitted by the secure web server directly the ACM CPU without using the backplane.

28 Claims, 2 Drawing Sheets

METHODS AND SYSTEMS FOR MANAGEMENT AND CONTROL OF AN AUTOMATION CONTROL MODULE

BACKGROUND OF THE INVENTION

This invention relates generally to automation control modules (ACMs) and more particularly to management and control of ACMs.

Remote monitoring and control of systems and processes have taken many forms. In the past, dedicated lines became the most common form of communication between a control system and a remote location. However, such systems have limited application since the control systems are not accessible from multiple locations. Modems have made it possible to access the control system from different locations, but these types of systems are generally restricted to downloading and uploading data files. Moreover, providing any type of control function between locations is rather limited in this type of environment.

Programmable logic controllers (PLCs) are widely used in industry and process control. At least some known systems provide factory automation information using various types of communication networking environments. These networks are usually slow, are not universally accessible and are limited to monitoring and data exchange. Control may be implemented, but since the communication networks are non-deterministic, control is not in real time. Specialized industrial networks using proprietary fieldbus alternatives can be very expensive. Conversion products are required to allow information carried over those networks to be visible on a general purpose network. There may be significant installation and other deployment costs associated with the existence of such intermediate devices.

At least some known applications and programs for ACMs are executed on general purpose computers that communicate with the ACMs over proprietary networks and protocols. However, developing and maintaining the proprietary networks and protocol increases the cost of ACM systems. Furthermore, because access to ACM data is typically restricted, communication between the general purpose computer and the ACM must be handled in a secure manner. As a result, such additional security measures also increases an overall cost of the ACM systems.

BRIEF DESCRIPTION OF THE INVENTION

In one aspect, an automation control module (ACM) is provided including an ACM central processing unit (CPU) and a web system electrically coupled to the ACM CPU. The web system is configured to process hypertext transfer protocol (HTTP) requests from a network such that a user on the network can configure the ACM using the network.

In another aspect, an automation control module (ACM) system is provided including an ACM, a network, a computer electrically coupled to the network and configured to communicate with the network, and a web subsystem electrically coupled to the ACM and the network. The subsystem is configured to process hypertext transfer protocol (HTTP) requests received from the computer through the network such that the computer can configure the ACM using the network.

In yet another aspect, a method is provided for management and control of an automation control module (ACM) including an ACM central processing unit (CPU) and a web system electrically coupled to the ACM. The web system is also electrically coupled to a network and the method includes electrically connecting the web system to the ACM CPU, and processing hypertext transfer protocol (HTTP) requests from the network using the web system such that a user on the network can configure the ACM using the network.

DETAILED DESCRIPTION OF THE INVENTION

Set forth below are descriptions of embodiments of methods and systems for control and management of an automation control module (ACM). The methods and systems facilitate viewing and controlling ACM data through standard networks, protocols, and browsers, developing and downloading user-defined web pages that include ACM data, and controlling the access level to the ACM and user-defined web pages.

The methods and systems are not limited to the specific embodiments described herein. Rather, components of each system and the associated steps of each method can be practiced independent and separate from other components and steps described herein. Each component and step can also be used in combination with other components and steps.

As used herein, the term ACM refers to any device used to control the automation of an activity, including but not limited to PLCs, computer numeric controls (CNCs), motion control products, home automation products, and commercial automation products. As used herein, ACM data includes different types of data within an ACM system 10 that control operation of ACM system 10. For example, ACM data includes, but is not limited to, user logic programs, user program memory, ACM status and statistics, ACM faults, setting ACM operating states, setting privilege levels, and any other useful ACM information.

Figure 1:
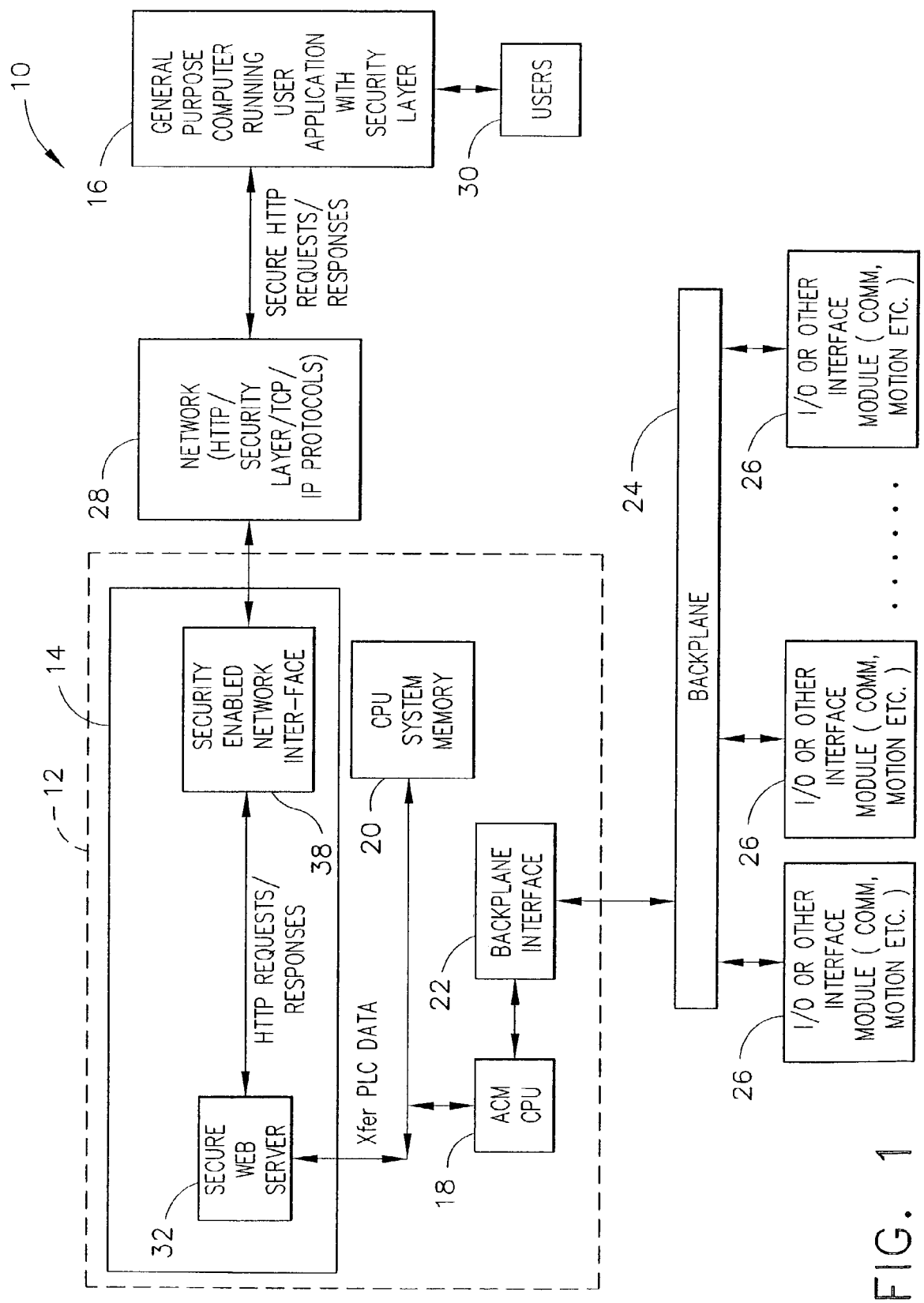
FIG. 1 is a block diagram illustrating one embodiment of an ACM system of the present invention.

FIG. 1 illustrates, in block diagram form, an exemplary hardware architecture that may be utilized in conjunction with an ACM management and control system. The system can be implemented on many different platforms and may utilize different architectures. The architectures illustrated in FIG. 1 are exemplary only.

FIG. 1 is a block diagram illustrating one embodiment of ACM system 10. System 10 includes an ACM 12, a web subsystem 14, and a computer 16. ACM 12 includes an ACM CPU 18 that executes ACM functions. For example, ACM CPU 18 may execute, but is not limited to executing, user logic and function block executions, input/output (I/O) scanning, and communications to other devices. ACM CPU 18 includes a CPU system memory 20 that is electrically coupled to CPU 18. In one embodiment, system memory 20 includes both the operating system (not shown) for ACM CPU 18, and a user's program and data. In one embodiment, an ACM I/O backplane interface 22 is coupled to ACM CPU 18, and provides an interface between ACM CPU 18 and an ACM backplane 24 coupled to interface 22. ACM backplane 24 provides a physical and an electrical means for connecting various I/O or other input modules 26, for example, communications or motion modules, into ACM 12. ACM backplane 24 facilitates data exchanges between modules 26 and ACM CPU 18. In one embodiment, at least one module 26 provides an interface for real world inputs (not shown), such as, but not limited to the limit or proximity switch status, the position of an object, the temperature, or the pressure, to ACM CPU 18 as parameters for logic or function block execution. In another embodiment, one or more modules 26 provide an interface to real world outputs (not shown) as commanded by ACM CPU 18 to control output devices (not shown)., such as, but not limited to, actuators, contactors, or solenoids.

Computer 16 is electrically coupled to a network 28. Network 28 includes the physical medium and intermediate devices (not shown), such as routers, and switches, that connect computer 16 to ACM 12. In one embodiment, network 28 is a wide area network (WAN), such as the Internet. In an alternative embodiment, network 28 is a local area network (LAN), such as an Intranet. In the exemplary embodiment, a user 30 accesses an Intranet or the Internet to gain access to ACM 12. In one embodiment, computer 16 includes a web browser, and ACM 12 is accessible to computer 16 via the Internet. Computer 16 is intercoupled to the Internet through many interfaces including, but not limited to, a different network (not shown), such as a WAN or a LAN, a dial in connection, a cable modem and a high-speed ISDN line. Computer 16 is any device capable of interconnecting to the Internet, and may include, a web-based telephone or other web-based connectable equipment.

Computer 16 executes a user application that makes decisions based on ACM data transferred from ACM 12 through a secure client connection through web subsystem 14 and network 28. Computer 16 displays ACM data on at least one web page (not shown), and retrieves web page files (not shown) stored on a secure web server 32 embedded within web subsystem 14. The web page files are text files that may contain hypertext markup language (HTML), Javascript, and/or references to other files, such as image files to be displayed with the web page or Java Applets. In another embodiment, the web page files include ACM tag functions that reference ACM data stored in CPU system memory 20. The tag facilitates the exchange of data between ACM CPU 18 and web server 32 embedded within web subsystem 14. Additionally, the tag provides a generic mechanism for user 30 to display and/or control ACM data using a standard browser. In one embodiment, computer 16 includes web authoring tools and/or text editors that, along with user input, are utilized to create and modify web page files.

Users 30 include at least one person who views and/or controls ACM data using computer 16. In one embodiment, users 30 include a person who created a web page file. Web subsystem 14 is electrically coupled to ACM CPU 18, CPU system memory 20, and network 28. Subsystem 14 is shown in FIG. 1 as embedded within ACM 12. In an alternative embodiment, subsystem 14 is contained in a separate module coupled to ACM backplane 24. Web subsystem 14 includes secure web server 32 and a secure network interface 38 that provides the lower level protocols (TCP/IP) and physical hardware connections to network 28 in a secure fashion. Secure web server 32 is electrically coupled to network interface 38, ACM CPU 18, and CPU system memory 20. More specifically, secure web server 32 provides a secure connection between secure web server 32 and computer 16 using a secure layer, such as, but not limited to, a secure sockets layer (SSL). In one embodiment, user 30 must enter a valid user name and valid user password to access ACM 12 and web subsystem 14. The user name and user password correspond to a user profile stored in secure web server 32. The user name and user password serve to authenticate secure web server 32 to computer 16 or alternatively, authenticate computer 16 to secure web server 32.

Upon accessing web subsystem 14, computer 16 and secure web server 32 communicate securely using security layer encrypted messages, based on mutually agreed to session keys for encryption and decryption, through network 28 and network interface 38. In one embodiment, server 32 and computer 16 communicate to select cryptographic algorithms that both server 32 and computer 16 support. Once a secure connection is established between secure web server 32 and computer 16, a user program on computer 16 generates a security layer encrypted hypertext transfer protocol (HTTP) request to access ACM data. Secure network interface 38 receives the request, decrypts the request and transfers the request to secure web server 32. Secure web server 32 processes the security layer encrypted hypertext transfer protocol (HTTP) requests to send web pages to computer 16 and, based upon the requests, sends a web page representing the requested web page through secure network interface 38 and network 28 to computer 16.

Secure network interface encrypts the web page representing the requested web page prior to sending it through network 28 to computer 16. Computer 16 decrypts the requested web page upon receiving the requested web page. If the requested web page includes a tag function, secure web server 32 parses and executes the tag function and either embeds ACM data within a web page file, thereby displaying the web page on a browser on computer 16, or transmits ACM data to ACM CPU 18. In one embodiment, secure web server 32 transfers ACM data to ACM CPU 18 to control operation of ACM 12.

Figure 2:
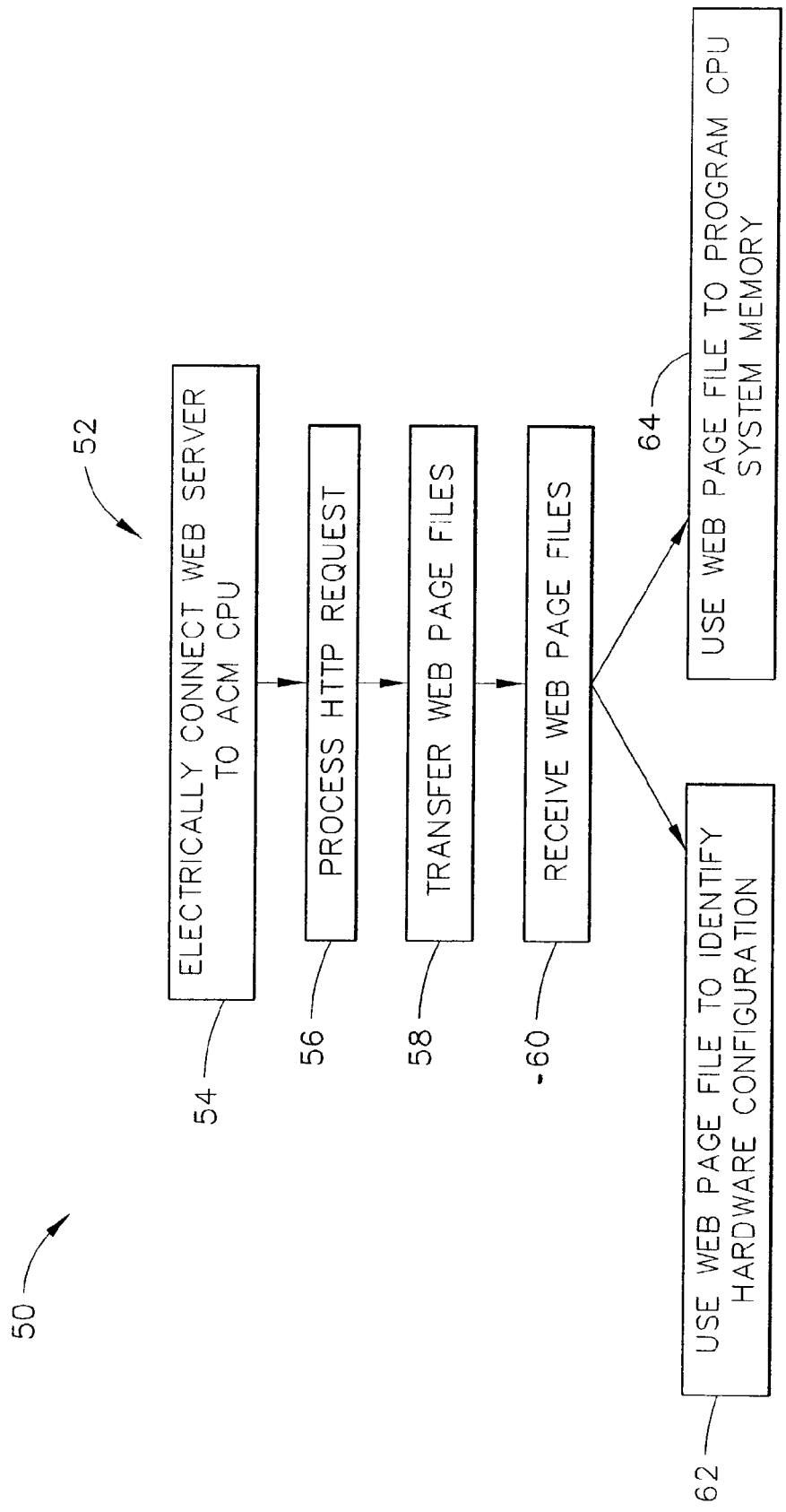
FIG. 2 is a flow chart illustrating one embodiment of a method for management and control of an automation control module using an ACM system.

FIG. 2 is a flow chart 50 illustrating an exemplary method 52 for management and control of ACM 12 (shown in FIG. 1). Method 52 includes electrically connecting 54 web server 32 (shown in FIG. 1) to ACM CPU 18 (shown in FIG. 1). Web server 32 processes 56 HTTP requests from network 28 (shown in FIG. 1) such that a user 30 on network 28 can at least one of program and configure ACM 12 using network 28. In one embodiment, web server 32 transfers 58 web page files from web server 32 to network 28 and a user on network 28 receives 60 the web page files and uses 62 the web page files to identify a hardware configuration of ACM 12. In another embodiment, web server 32 transfers 58 web page files from web server 32 to network 28 and a user on network 28 receives 60 the web page files and uses 64 the web page files to program CPU system memory 20.

ACM system 10 facilitates reducing system hardware costs, shortening development time of custom ACM monitoring and control tools that reduce implementation costs, and increasing response time for accessing ACM data while reducing an impact on other critical real-time ACM functions, such as ACM sweep time, thereby reducing production costs. In addition, ACM system 10 facilitates rapid access to ACM data on standard devices such as a web browser on computer 16 or PDA via a standard network in a secure fashion. ACM system 10 also facilitates users programming and/or configuring ACM 12 using standard computer software.

While the invention has been described in terms of various specific embodiments, those skilled in the art will recognize that the invention can be practiced with modification within the spirit and scope of the claims.

What is claimed is:

1. An automation control module (ACM) comprising:
an ACM central processing unit (CPU);
a backplane electrically coupled to said ACM CPU; and
a web subsystem comprising a secure web server, said web subsystem electrically coupled to said ACM CPU, and configured to process hypertext transfer protocol (HTTP) requests from a network to program and configure said ACM through the network, the HTTP requests received by said secure web server and transmitted by said secure web server directly to said ACM CPU without using said backplane.

2. The ACM in accordance with claim 1 wherein said web server is electrically coupled to said ACM CPU and the network, and is configured to process HTTP requests from the network to program and configure said ACM through the network.

3. The ACM in accordance with claim 1 wherein said web server is configured to respond to HTTP requests from the network.

4. The ACM in accordance with claim 3 wherein said web subsystem further comprises at least one web page file.

5. The ACM in accordance with claim 1 wherein said web server is configured to transfer ACM data from said ACM CPU to the network.

6. The ACM in accordance with claim 1 wherein said web server is configured to transfer ACM data to said ACM CPU.

7. The ACM in accordance with claim 4 wherein said web server is configured to:
   transfer ACM data from said ACM CPU; and
   embed said ACM data within said at least one web page file based on function tags embedded within said at least one web page file.

8. The ACM in accordance with claim 1 wherein said web server is further configured to transfer web page files via the network to a user on the network, wherein the user receives the web page files and uses the web page files to identify the hardware configuration of the ACM.

9. The ACM in accordance with claim 1 further comprising a system memory coupled to said ACM CPU, wherein said web server is further configured to transfer web page files via the network to a user on the network, wherein the user receives the web page files and uses the web page files to program said system memory.

10. The ACM in accordance with claim 1 wherein said web subsystem further comprises a network interface configured for connection to the network.

11. The ACM in accordance with claim 1 wherein said ACM comprises a backplane interface electrically coupled to said ACM, said backplane electrically coupled to said backplane interface, said backplane configured for connection with at least one of an input/output (I/O) module and an input module.

12. The ACM in accordance with claim 1 wherein said web subsystem is configured to process HTTP requests to program said ACM, and said ACM comprises a programmable logic controller (PLC).

13. The ACM in accordance with claim 1 wherein said web subsystem is configured to process HTTP requests to control an operation of said ACM, and said ACM comprises a programmable logic controller (PLC).

14. An automation control module (ACM) system comprising:
   an ACM comprising a backplane and an ACM CPU;
   a network;
   a computer electrically coupled to said network and configured to communicate with said network; and
   a web subsystem comprising a secure web server, said web subsystem electrically coupled to said ACM and said network, said web subsystem configured to process hypertext transfer protocol (HTTP) requests received from said computer through said network to program and configure said ACM using the network, the HTTP requests received by said secure web server and transmitted by said secure web server directly to said ACM CPU without using said backplane.

15. The ACM system in accordance with claim 14 wherein said web server is electrically coupled to said ACM and said network, and is configured to process HTTP requests received from said computer through said network to program and configure said ACM using said network.

16. The ACM system in accordance with claim 14 wherein said web server is configured to respond to HTTP requests from said computer using said network.

17. The ACM system in accordance with claim 14 wherein said web server further comprises at least one web page file.

18. The ACM system in accordance with claim 14 wherein said web server is configured to transfer ACM data from said ACM CPU to said computer using said network.

19. The ACM system in accordance with claim 14 wherein said web server is configured to transfer ACM data to said ACM CPU.

20. The ACM system in accordance with claim 18 wherein said web server is configured to transfer ACM data from said ACM CPU to said computer and embed said ACM data within said at least one web page file based on function tags embedded within said at least one web page file.

21. The ACM system in accordance with claim 14 wherein said web server is further configured to transfer web page files to said computer using said network and said computer is configured to receive said web page files and use said web page files to identify a hardware configuration of said ACM.

22. The ACM system in accordance with claim 14 further comprising a system memory coupled to said ACM CPU, wherein said web server is further configured to transfer web page files to said computer using said network and said computer is configured to receive said web page files and use said web page files to program said system memory using said network.

23. The ACM system in accordance with claim 14 wherein said web subsystem further comprises a network interface configured for connection to said web server and said network.

24. The ACM system in accordance with claim 14 wherein said ACM comprises a backplane interface electrically coupled to said ACM, said backplane electrically coupled to said backplane interface, said backplane configured for connection with at least one of an input/output (I/O) module and an input module.

25. The ACM system in accordance with claim 14 wherein a user is required to enter a valid user name and user password to access said ACM system.

26. A method for management and control of an automation control module (ACM) including an ACM central processing unit (CPU), a backplane, and a web subsystem electrically coupled to the ACM and a network, wherein the web subsystem includes a secure web server, said method comprising:
   embedding the web server within the web subsystem;
   electrically connecting the web subsystem to the ACM CPU;
   receiving hypertext transfer protocol (HTTP) requests from the network using the web subsystem;
   transmitting the HTTP requests directly from the web subsystem to the ACM CPU without using the backplane; and
   processing the HTTP requests using the ACM CPU to facilitate programming and configuring the ACM using the network.

27. The method in accordance with claim 26 wherein processing HTTP requests from the network using the web server to facilitate programming and configuring the ACM using the network comprises:
  transferring web page files from the web server to the network;
  receiving the web page files using the network; and
  using the web page files to identify a hardware configuration of the ACM.

28. The method in accordance with claim 26 wherein the ACM further comprises a system memory electrically coupled to the ACM CPU, said processing HTTP requests from the network using the web server to facilitate programming and configuring the ACM using the network comprising:
  transferring web page files from the web server to the network;
  receiving the web page files using the network; and
  using the web page files to program the system memory.

* * * * *

UNITED STATES PATENT AND TRADEMARK OFFICE
CERTIFICATE OF CORRECTION

PATENT NO.      : 7,590,712 B2
APPLICATION NO. : 10/238360
DATED           : September 15, 2009
INVENTOR(S)     : Chambers, II et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 934 days.

Signed and Sealed this

Fourteenth Day of December, 2010

David J. Kappos
*Director of the United States Patent and Trademark Office*